US008904074B2

(12) United States Patent
Lee et al.

(10) Patent No.: US 8,904,074 B2
(45) Date of Patent: Dec. 2, 2014

(54) METHOD AND APPARATUS FOR DISTRIBUTING CONFIGURATION FILES IN A DISTRIBUTED CONTROL SYSTEM

(75) Inventors: Kenneth S. Lee, Cambridge, MA (US); Richard A. Blair, Plaistow, NH (US); Nitin Dhayagude, North Andover, MA (US); Kerry Van de Steeg, Windham, NH (US); Heinz Schaffner, Hessen (DE)

(73) Assignee: Schneider Electric USA, Inc., Palatine, IL (US)

( * ) Notice: Subject to any disclaimer, the term of this patent is extended or adjusted under 35 U.S.C. 154(b) by 209 days.

(21) Appl. No.: 11/967,470

(22) Filed: Dec. 31, 2007

(65) Prior Publication Data

US 2009/0172223 A1 Jul. 2, 2009

(51) Int. Cl.
*G06F 13/00* (2006.01)
*G06F 3/00* (2006.01)
*G05B 19/05* (2006.01)

(52) U.S. Cl.
CPC ...... *G05B 19/054* (2013.01); *G05B 2219/1101* (2013.01); *G05B 2219/1142* (2013.01); *G05B 2219/1138* (2013.01)
USPC ............................... 710/110; 710/8; 710/104

(58) Field of Classification Search
USPC ................... 710/110, 107, 2, 8, 10, 104–106, 710/305–306; 709/220, 221, 222
See application file for complete search history.

(56) References Cited

U.S. PATENT DOCUMENTS 5,109,484 A * 4/1992 Hughes et al. ................. 709/222
5,594,886 A * 1/1997 Smith et al. ................... 711/136
5,841,654 A * 11/1998 Verissimo et al. .............. 700/83
6,298,446 B1 * 10/2001 Schreiber et al. ............... 726/27
6,446,202 B1 9/2002 Krivoshein et al.
2004/0054829 A1 * 3/2004 White et al. .................. 710/105
2004/0236885 A1 * 11/2004 Fredriksson et al. ......... 710/100
2005/0002417 A1 * 1/2005 Kelly et al. ................... 370/466
2005/0108442 A1 * 5/2005 Aschenbrenner ................ 710/1
2005/0256939 A1 11/2005 Naismith et al.

(Continued)

FOREIGN PATENT DOCUMENTS

| EP | 1762918 | 3/2007 |
| GB | 2403043 | 12/2004 |
| JP | 4157532 | 5/1992 |
| WO | 2007/149688 | 12/2007 |

OTHER PUBLICATIONS

Persson, Lars. "A Comparison between Fieldbuses and Remote I/O for Instruments in the Process Industry". Dec. 17, 2006. Luleå University of Technology.*

(Continued)

*Primary Examiner* — Thomas J Cleary
(74) *Attorney, Agent, or Firm* — Banner & Witcoff, Ltd.

(57) ABSTRACT

The invention described herein provides a system and method for distributing and applying a configuration file from a master device (102) to a slave device (104) in a distributed control system (100). According to aspects of the invention, a configuration file is saved at a master device (102) and distributed to the slave device (104) via the data payload of a fieldbus protocol, such as the CANopen protocol. Aspects of the present invention may be used to further configure an I/O island or sub-network (108) that is attached to the slave device (104). Further aspects of the present invention may be used to repair or replace failed devices in a distributed control system (100).

23 Claims, 4 Drawing Sheets

(56) References Cited

U.S. PATENT DOCUMENTS

| | | | |
|---|---|---|---|
| 2006/0268854 A1* | 11/2006 | Lee | 370/389 |
| 2009/0033359 A1* | 2/2009 | Rofougaran | 326/39 |
| 2011/0119507 A1* | 5/2011 | Reidt | 713/300 |

OTHER PUBLICATIONS

Schneider Electric: "Advantys STB Standard CANopen Network Interface Module Applications Guide", Manual, Oct. 2007, 204 pages.

International Search Report for PCT Application No. PCT/US2008/088404, dated Jun. 2, 2009.

CANopen, Framework for CANopen Managers and Programmable CANopen Devices, CiA Draft Standard Proposal 302, Oct. 10, 2003, pp. 1-57, version 3.3.0, CAN in Automation, Germany.

Etschberger, K. et al. CANopen-based Distributed Intelligent Automation, Mar. 9, 2007, pp. 1-14, online at: CANopensolutions.com, IXXAT Automation GmbH.

Hoske, Mark T, I/O Modules, Mar. 24, 2007, pp. 1-6, online at: http://www.controleng.com/article/CA6303473.html, Reed Business Information.

CANopen Compliant Bootloader, CANopen Bootloader for Atmel CANary devices, Mar. 9, 2007, pp. 1-4, Embedded Systems Academy.

ILB ETH 24 DI16 D1016-2TX, Inline Block IO Module for Ethernet with 16 Digital Inputs and 16 Digital Inputs or Outputs, Feb. 2005, pp. 1-48, Phoenix Contact.

CANopen Bootloader, 2006, pp. 1-3, Port GmbH, Germany.

Boterenbrood, Henk, CANopen Bootloader for the ELMB ATmega128 Microcontroller, Mar. 10, 2004, pp. 1-9, version 1.1, NIKHEF, Amsterdam.

* cited by examiner

METHOD AND APPARATUS FOR DISTRIBUTING CONFIGURATION FILES IN A DISTRIBUTED CONTROL SYSTEM

CROSS-REFERENCE TO RELATED APPLICATIONS

This application is related to U.S. Patent Application Publication No. 2006/0268854 A1, filed May 26, 2005. This application is also related to U.S. patent application Ser. No. 11/755,706, filed May 30, 2007 and U.S. patent application Ser. No. 11/755,709, filed May 30, 2007. All three of these prior applications are hereby incorporated by reference in their entirety.

FEDERALLY SPONSORED RESEARCH OR DEVELOPMENT

None.

TECHNICAL FIELD

The present invention generally relates to configuring modular distributed I/O systems and complex control systems in industrial automation networks. More specifically, the present invention relates to methods for the automatic distribution of configuration files in such systems via a fieldbus protocol and to mechanisms for a receiving device to apply the configuration file after receiving it.

BACKGROUND

A programmable logic controller (PLC) is used to monitor input signals from a variety of input points (i.e., input sensors) that report events and conditions occurring within a controlled process. For example, a PLC can monitor such input conditions as motor speed, temperature, pressure, volumetric flow and the like. The PLC has a control program stored within its memory to instruct the PLC on what actions to take upon encountering particular input signals or conditions. In response to these input signals provided by the input sensors, the PLC derives and generates output signals that are transmitted to control the process via PLC output points to various output devices such as actuators and relays. For example, an output signal can be provided by the PLC to speed up or slow down a conveyer, rotate the arm of a robot, open or close a relay, raise or lower temperature, as well as many other possible control functions.

The input and output points referred to above are typically associated with input modules and output modules, respectively. Input and output modules are collectively referred to as I/O modules herein. Those skilled in the art alternatively refer to such I/O modules as I/O cards, I/O points or I/O boards. I/O modules are typically adapted to be plugged into respective slots located on a backplane board or other attachment system provided by the PLC. The slots are coupled together by a main bus that couples any I/O module plugged into the slots to a central processing unit (CPU). The CPU itself can be located on a card that is adapted to be plugged into a dedicated slot on the backplane board of the PLC.

In many control systems, PLCs are arranged in a master-slave network that includes a master PLC and a plurality of remote slave units that can include other PLCs or devices. In this type of a network, the master PLC controls its own I/O connection points and also the respective I/O connection points for the remote slave unit(s). The control commands from the master PLC are derived from data obtained from its own I/O connection points as well as data obtained from the remote slave units. Data obtained from the remote slave units is typically obtained from the I/O module(s) connected to each remote slave unit.

To meet the needs of machine manufacturers and users, automation architectures have been decentralized or distributed while delivering performance comparable to centralized systems. For instance, the ADVANTYS STB distributed I/O system is an open, modular input/output system that makes it possible to design islands of automation managed by a master controller via a bus or communication network. The ADVANTYS STB distributed I/O system is a product of Schneider Automation Inc., One High Street, North Andover, Mass.

Often, an I/O island and its associated I/O modules may be widely dispersed and may be in isolated locations, or the target systems may be enclosed in other machinery. In these types of network operations, getting physical access to the remote slave unit or the I/O module to configure the device or update a configuration file can be difficult.

SUMMARY OF THE INVENTION

Aspects of the present invention provide a framework for downloading and applying configuration files to a slave device via the same connection that is used to control the slave device. According to embodiments of the invention described herein, a configuration file is created and saved at a master device in a distributed control system. The configuration file is then remotely downloaded to the slave device via the data payload of a fieldbus protocol such as the CANopen protocol via the CANopen field for configuration of the slave device and for configuration of a sub-network that is attached to the slave device when part of a distributed I/O island.

In other embodiments of the present invention, upon boot-up by a slave device, the master device queries the slave device to determine if the slave device or devices, such as I/O points, on an attached sub-network need an updated configuration file. The slave device may also query the master device upon boot-up to determine if the master device contains an updated configuration file. By comparing certain parameters of the configuration files saved on both the master device and the slave device, the devices can determine if the configuration files match. If the configuration files do not match, the master can distribute the new or updated configuration file to the slave device via a fieldbus protocol.

BRIEF DESCRIPTION OF THE DRAWINGS

The present invention is illustrated by way of example in the following figures and is not limited by the accompanying figures in which.

DETAILED DESCRIPTION OF THE INVENTION

Figure 1:
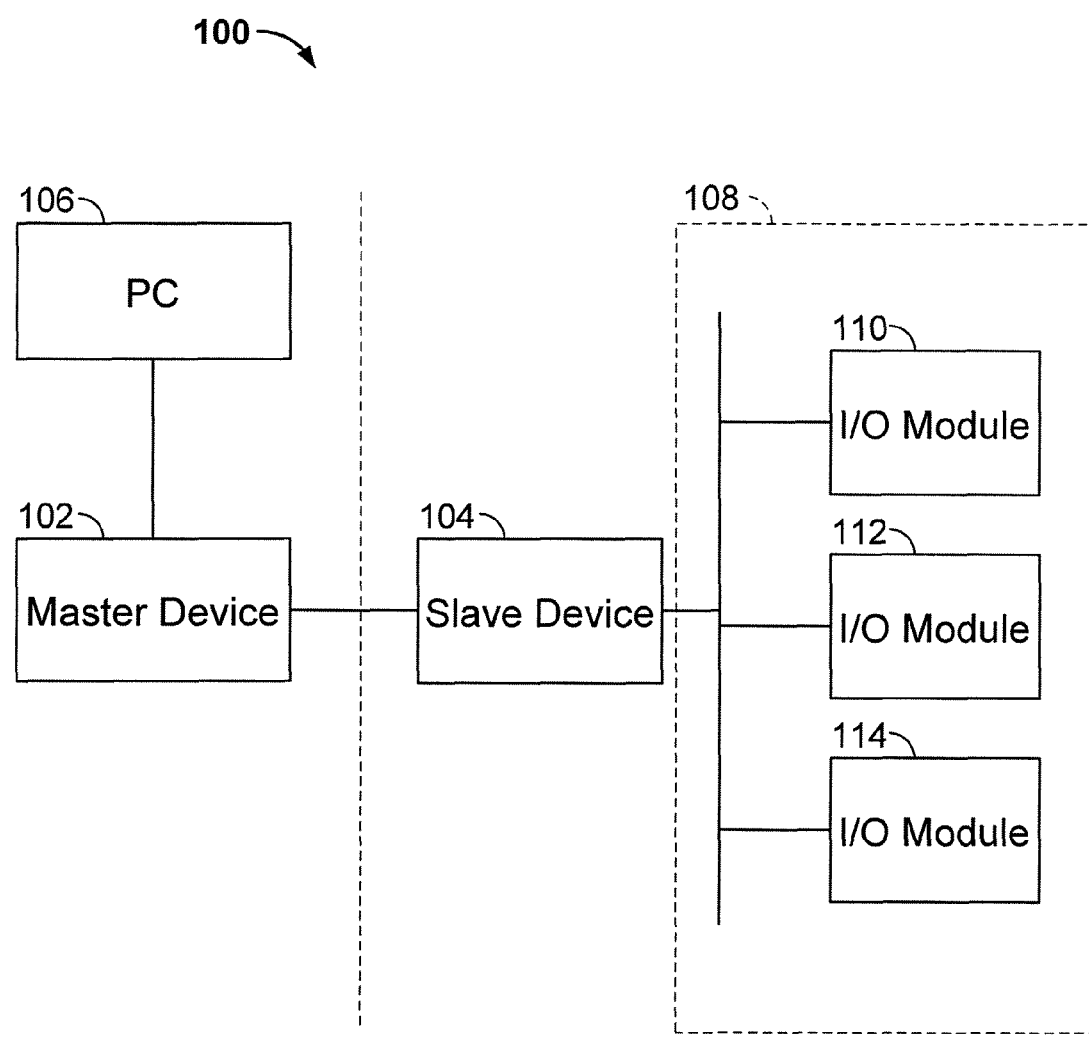
FIG. 1 depicts an exemplary distributed control system in which an embodiment of the present invention may be performed.

Aspects of the present invention provide a mechanism for distributing configuration files to a slave device in a distributed control system, such as an industrial automation network. FIG. 1 depicts an exemplary distributed control system on which an embodiment of the present invention may be performed. The network 100 includes exemplary master device 102 and exemplary slave device 104. In the context of an industrial automation system, the master device may be a PLC, as described above, and the slave device may be a network interface module (NIM). The slave device 104 may be additionally connected to additional computing devices such as sub-network 108 with I/O modules 110, 112, and 114. Those of ordinary skill in the art will recognize that the sub-network 108, or both the slave device 104 and the sub-network 108 depicted in FIG. 1 may be referred to as an I/O island in certain manufacturing or industrial automation applications. Those skilled in the art will also recognize that aspects of the present invention may be implemented on a variety of different computing devices. For example, depending on the application, sub-network 108 could contain sensors or other control devices.

Figure 2:
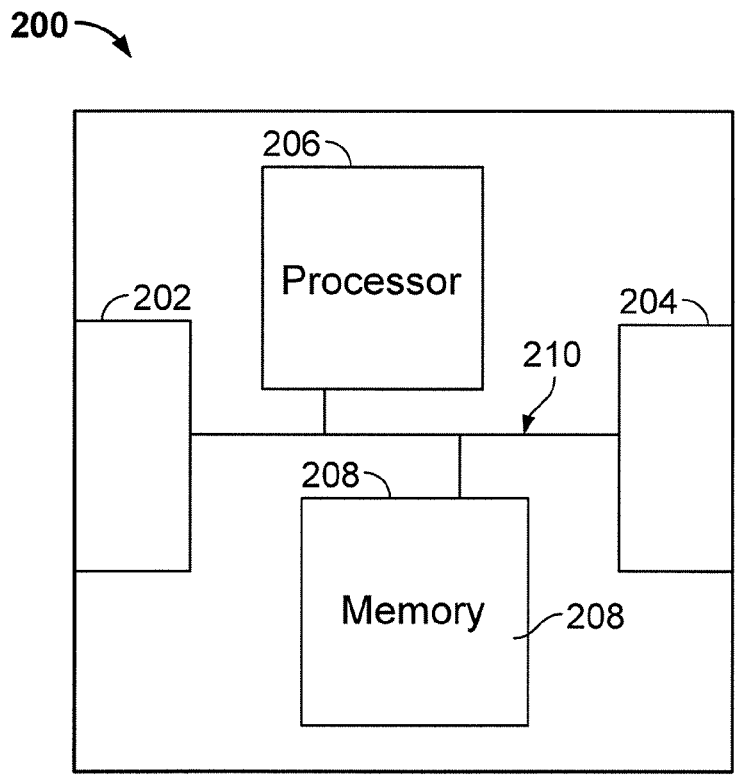
FIG. 2 depicts an exemplary computing device, suitable for implementing the techniques described herein.

Aspects of the invention may be implemented with a variety of conventional networked computers systems such as the network device 200 shown in FIG. 2. Anyone of the computing devices depicted in FIG. 1 may be implemented with a device such as network device 200. Device 200 includes network interface ports 202 and 204 for receiving and sending data traffic, a central processor 206, a system memory 208, and a system bus 210 that couples various system components including ports 202 and 204, central processor 206 and the system memory 208. System bus 210 may be any of several types of bus structures including a memory bus or memory controller, a peripheral bus, and a local bus using any of a variety of bus architectures. The structure of system memory 208 is well known to those skilled in the art and may include a basic input/output system (BIOS) stored in a read only memory (ROM) and one or more program modules such as operating systems, application programs and program data stored in random access memory (RAM). Interfaces 202 and 204 may be any type of network interface well known to those skilled in the art. Furthermore, computer 200 may include drives for interfacing with other types of computer readable media.

The operation of node 200 can be controlled by a variety of different program modules operable to implement a fieldbus protocol such as the CANopen protocol. Examples of program modules are routines, programs, objects, components, data structures, etc., that perform particular tasks or implement particular abstract data types. The present invention may also be practiced in a distributed computing environment where tasks are performed by remote processing devices that are linked through a communications network such as a local area network (LAN), or a wide area network (WAN) such as the Internet. In a distributed computing environment, program modules may be located in both local and remote memory storage devices.

Figure 3:
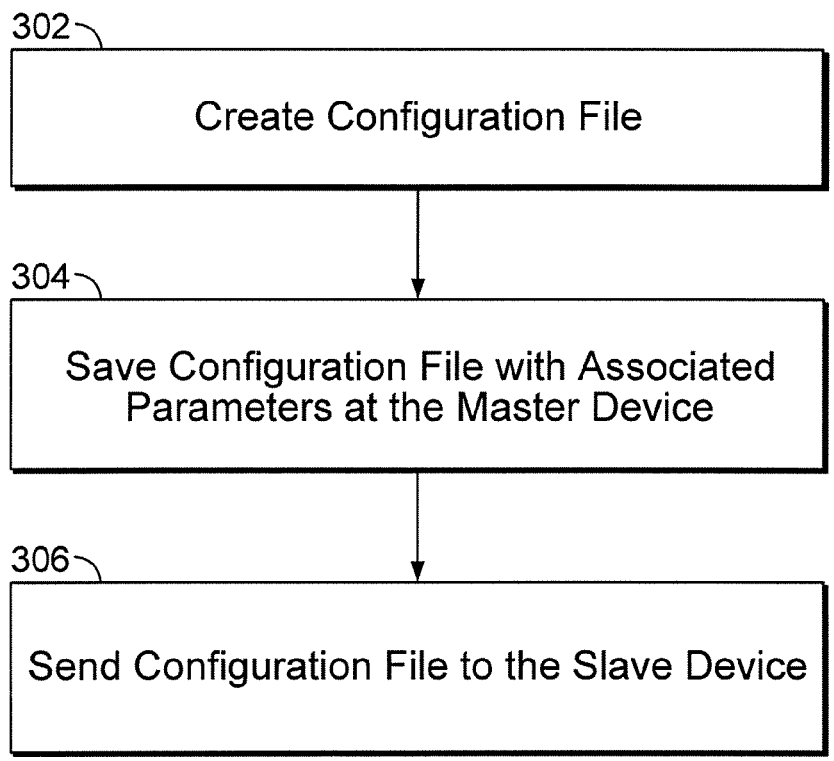
FIG. 3 is a flowchart depicting an embodiment of the configuration download technique according to the present invention.

FIG. 3 depicts a flowchart of one embodiment of the configuration download technique according to an embodiment of the present invention. At step 302 the configuration file is created at the master device. Creation of the configuration file may be accomplished directly at the master device via a user interface, or may be written at a separate computing device and transferred to the master device. For example, a user may construct, in a program on a separate computing device, such as PC 106 in FIG. 1, a representation of all of the modules and their associated parameters in a sub-network or an island. The configuration file may consist of parameters specified by the user that direct behavior of the island or sub-network, such as characteristics related to an I/O point and how the I/O point behaves in the system or is used by an application. Examples of parameters may be how the I/O point behaves during an error situation, whether or not the I/O point has a filter on it, and, if the I/O point is analog, how much voltage the I/O point can expect. The parameters will be unique to how a user uses an I/O point within the island, and those of ordinary skill in the art will understand the various parameters that may be necessary for configuration of a sub-network such as an I/O island. In addition, those of ordinary skill in the art will understand and be able to provision a software program capable of generating the desired configuration data and sequences for each target computing device, regardless of whether the target device is an I/O point or is another type of computing device.

Once the configuration profile is built, at step 304, the configuration file is saved by the master device. The configuration file may be saved with a related time-stamp and date-stamp of when the file was created, a file version, a hash code, or other parameter that may identify the version of the configuration file. Such parameters may be used at a future time to determine if a slave device has the most recent version of a configuration file. The configuration file may be saved directly on the master device or may be saved in a separate device, such as in a database existing on a separate device. At step 306 the instructions are sent in one or more sequential files, via a fieldbus protocol such as the CANopen protocol, to the slave device.

Those skilled in the art will recognize that a fieldbus network is a control and/or computer network that is used in industrial automation and process control systems. Different fieldbus protocols may choose to specify different layers in the International Standardization Organization/Open Systems Interconnect model (the "OSI model"), as defined by the standard ISO/IEC 7498-1. The configuration file may be completely protocol independent and the invention may be implemented with any fieldbus protocol or other protocol that operates in the application layer of the OSI model, and uses an object-oriented representation of the fieldbus devices, such as CANopen, Ethernet/IP and DeviceNet. Those skilled in the art will further be able to identify other fieldbus protocols that use object-oriented representations of the field devices such that they could be used with the current invention.

Figure 4:
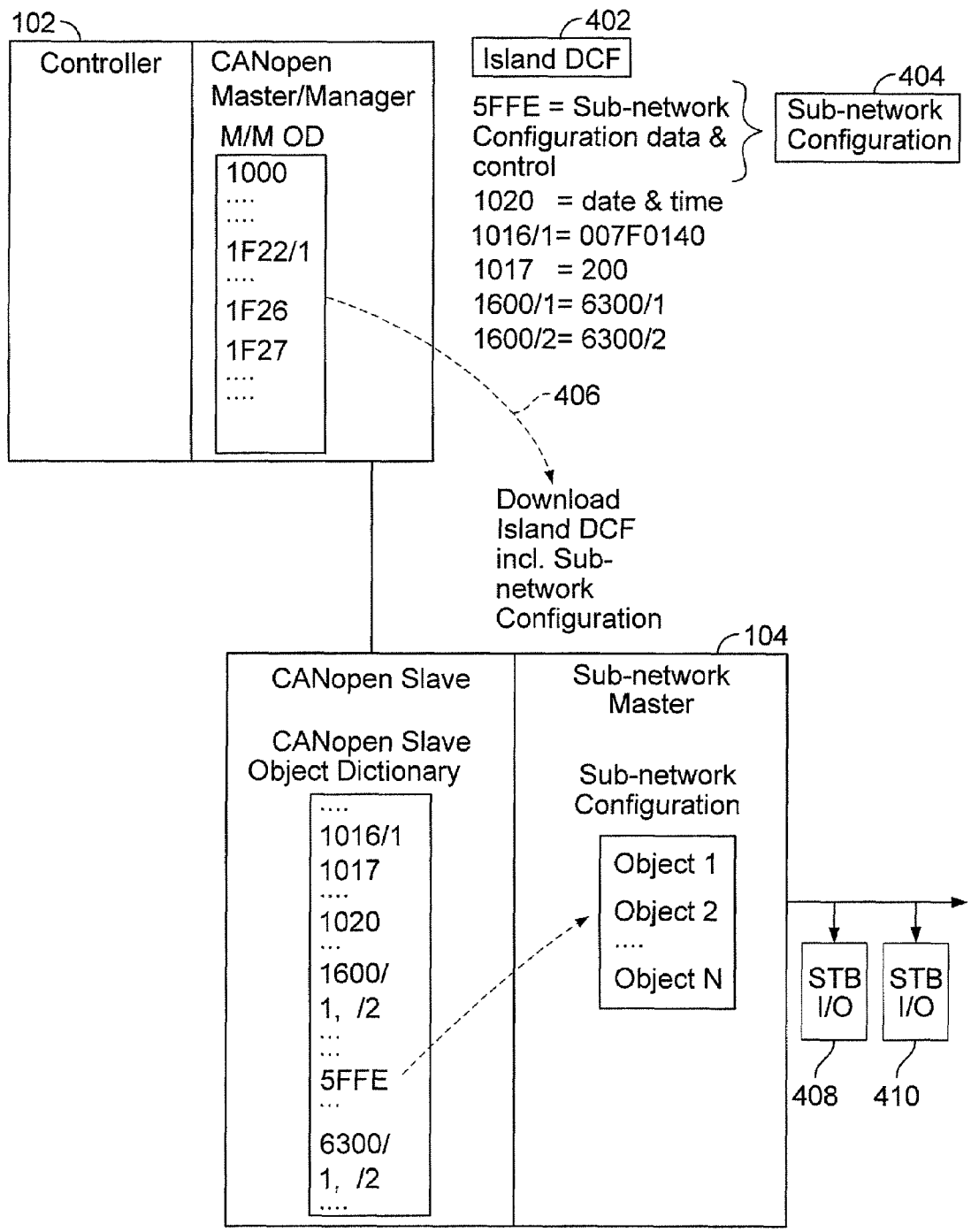
FIG. 4 is a logical depiction of an exemplary configuration file to be sent to a slave device via CANopen, according to an embodiment of the present invention.

FIG. 4 depicts the flow of a configuration file from master device 102 to slave device 104 via the CANopen protocol, according to one embodiment of the invention. CANopen is a fieldbus protocol that is often used for communication in distributed control systems. The CAN in Automation (CiA) non-profit organization publishes standards that are used in the Automation industry for the implementation of the CANopen protocol. The CANopen objects and standards referenced herein and in FIG. 4 are further described in the CAN in Automation (CiA) Draft Standard Proposal 302 Ver. 3.3.0, "Framework for CANopen Managers and Programmable CANopen Devices."

Many CANopen devices use configuration software to generate a device configuration file (DCF in CANopen). The DCF file defines parameters that are used for configuration of a CANopen device. For a slave device controlling an island of simple I/O modules, such parameters may include polarity and filter times. FIG. 4 depicts Island DCF file 402, which contains the information needed to configure the sub-network, i.e. sub-network configuration 404. DCF file 402 depicts the types of CANopen data that may be included in a CANopen DCF file. In FIG. 4, DCF file 402 may be created by the CANopen master device 102 and may be downloaded via connection 406 to the CANopen slave device 104 using standard CANopen objects. The DCF file 402 may then be unpacked and used for configuration of device 104. In the embodiment described in FIG. 4, the content object 5FFE contains the sub-network configuration objects. Object 5FFE may be unpacked and used for configuration of the smart terminal block (STB) I/O points 408 and 410, as well as for reconfiguration of node 104 as needed.

The I/O points 408 and 410, which are attached to slave device 104, thus may be configured by the creation and distribution of DCF file 402. According to aspects of the present invention, the configuration data for the attached devices or, collectively, the island, is created either at the master device 102 or at an attached computing device 106 as seen in FIG. 1. Once created, the master device 102 can transfer the configuration file to the slave device 104 via the CANopen protocol for configuration of the attached island. However, information inside the configuration object may not be static. For instance, in an automation system, the device configuring the sub-network must be commanded to perform some tasks while processing the data needed to configure the sub-network.

Aspects of the invention use a standards-based approach, by using pre-defined objects to send data to a slave device. In addition to the configuration information, control commands may be sent with the data so that the slave device can act upon the configuration data received. When the slave device receives the information, it may process the data and use the data to configure itself and any attached network or island.

One of the benefits of certain embodiments of the invention described herein is that the master device maintains an image of the configuration file. If the system recycles power, or if a failed NIM or I/O device must be replaced, the saved image can be used to validate the configuration of the slave device after power recycle, or can be reloaded onto a slave device that is replaced.

Figure 5:
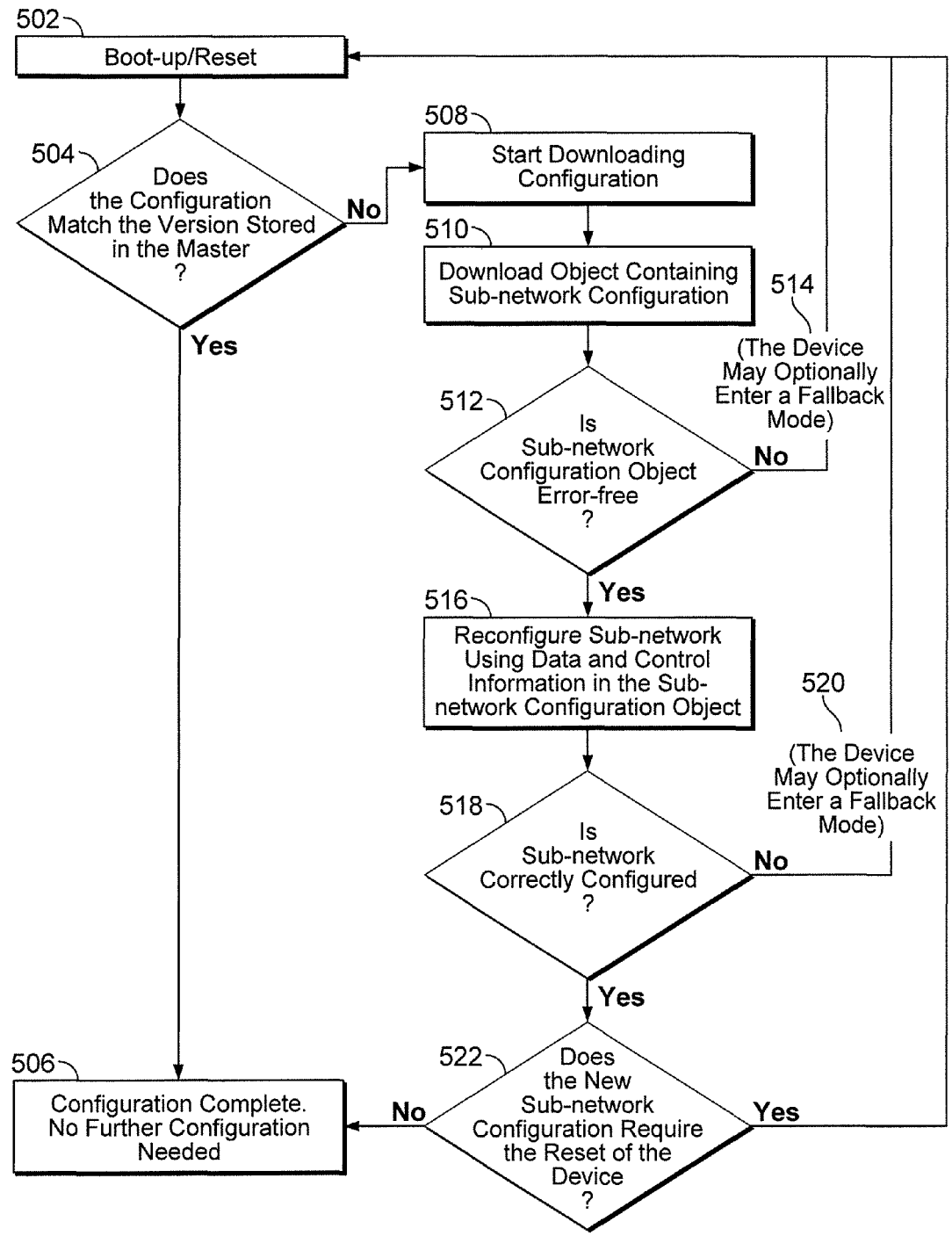
FIG. 5 is a flowchart depicting the reloading of a configuration file according to an embodiment of the present invention.

According to embodiments of the present invention, a power recycle or slave device update may involve multiple communications with the master device via a fieldbus protocol. FIG. 5 describes the process of configuration check and update according to an embodiment of the present invention. At step 504, the master may query one or more slave devices to determine if the configuration on the slave device(s) matches the configuration on the master device. During such a query the master can compare various parameters associated with the current configuration file saved on the master device, such as a time-stamp, a date-stamp, a file version, a hash code, or other parameter that may identify the version of the configuration file, with the respective parameters of a slave device's configuration file. If the configuration files on both the master device and the slave device(s) match, the master device does not need to update the configuration file (step 506). However, if it is determined that the configuration files do not match, at steps 508-510, the master can download the updated configuration and sub-network configuration to the slave device(s) via the fieldbus protocol. At step 512, the slave device may determine if the sub-network configuration is error-free. If the configuration is not error free, at step 514 the device may optionally enter a fallback mode to either continue with a current set of parameters or to abort the configuration check sequence altogether. If the sub-network configuration is error-free, at step 516 the slave device can reconfigure the sub-network using the data and the control information contained in the sub-network configuration object. At step 518, the slave device may ensure that the sub-network has been correctly configured using the configuration information. If the sub-network has not been correctly configured, at step 520 the device may optionally enter a fallback mode to either continue with a current set of parameters or to abort the configuration check sequence altogether. If the slave device determines that the sub-network has been correctly configured, at step 522 the slave device may determine if the new configuration requires the reset of the slave device or of a device on the sub-network. If a device reboot is not required, the configuration update may be considered complete. However, if the slave device determines that a device reboot is necessary, the slave device can reenter boot-up procedure at step 502. According to another embodiment of the invention, a slave device may initiate a query with the master to determine if the respective configuration files match.

Embodiments of the invention also allow for failed device replacement situations, such as when an old device is removed. Failed device replacement involves replacing a slave device or an I/O module that has been corrupted or otherwise rendered inoperative. According to aspects of the present invention described above, a user can remove a failed device and install a new device, and have the master re-download the configuration file to the device. According to embodiments described herein, configuration of the device may be automated at the time the failed device is removed and a new device is connected. When a master device recognizes that a new slave device has been installed or that there is a new device on a sub-network attached to a slave device, the master device can check the configuration of the new device and proceed through the same sequence described above to either load or update the configuration on the new device. This process may also be initiated by the new slave device on the network.

Persons of ordinary skill in the art will recognize that the foregoing techniques may be implemented on a variety of networking systems and with a variety of transmission media. Networks based on wire, fiber optic cable, wireless or other transmission media may utilize the present invention. It should be further noted that certain aspects of the present invention have been described herein, but the invention is not limited to the embodiments described. Those skilled in the art will recognize additional variations embodied by the present invention upon reading or upon practice of the invention. The following claims demonstrate the breadth of the invention.

We claim:

1. In a distributed control system of an industrial automation network, the control system having a master device, a slave device, and a sub-network of control devices that comprises a first control device, wherein the first control device is coupled to the slave device, a method comprising:
   receiving at the slave device, from the master device, a configuration file in a data payload via a fieldbus protocol;
   extracting at the slave device the configuration file;
   configuring the slave device using the configuration file; and
   configuring, by the slave device, the first control device from a subset of configuration information contained in the configuration file.

2. The method of claim 1, wherein the fieldbus protocol is the CANopen protocol.

3. The method of claim 1, wherein the sub-network of control devices includes a plurality of I/O modules.

4. The method of claim 1, further comprising using, by the slave device, the configuration file to configure other control devices of the sub-network of control devices.

5. The method of claim 1, further comprising creating the configuration file by the master device.

6. The method of claim 1, further comprising creating the configuration file by a computing device separate from the master device, and transferring the configuration file to the master device.

7. In a distributed control system of an industrial automation network, the control system comprising a master device, a slave device, and a sub-network of control devices including a first control device coupled to the at least one slave device, a method comprising:
  creating at the master device a configuration file, wherein the configuration file contains a configuration object for configuring the first control device;
  sending, by the master device, the configuration file to the slave device via one or more data payload portions of a fieldbus protocol;
  configuring the slave device using the configuration file; and
  configuring, by the slave device, the first control device based on the configuration object.

8. The method of claim 7, wherein the fieldbus protocol is the CANopen protocol.

9. The method of claim 7, wherein the sub-network of control devices comprises a plurality of I/O modules.

10. The method of claim 7, wherein the creating at the master device the configuration file comprises:
  receiving configuration instructions from a separate computing device; and
  formatting the configuration instructions into the configuration file.

11. The method of claim 7, further comprising:
  saving the configuration file at the master device.

12. The method of claim 11, wherein the saving of the configuration file includes saving a date and a time corresponding to when the configuration file was created.

13. The method of claim 12, further comprising:
  determining, responsive to detecting that the slave device re-boots, whether a current configuration file on the slave device has a date and time that match the date and time corresponding to when the configuration file was created by the master; and
  re-sending by the master device, responsive to determining that the date and time on the current configuration file on the slave device do not match the date and time corresponding to when the configuration file was created by the master, the configuration file to the slave device via one or more data payload portions of the fieldbus protocol.

14. The method of claim 12, further comprising:
  sending by the master device, responsive to recognizing that a second slave device boots up, the configuration file to the second slave device via one or more data payload portions of the fieldbus protocol.

15. An industrial automation system comprising:
  a programmable logic controller (PLC) having a software program for creating and sending a downloadable configuration file via one or more data payload portions of a fieldbus protocol;
  a network interface module (NIM) coupled to the PLC via a fieldbus network, the NIM adapted to receive the downloadable configuration file via the fieldbus network from the PLC and to be configured using the configuration file; and
  an I/O module coupled to the NIM, the I/O module being configured by the NIM using a subset of configuration information contained in the configuration file.

16. The industrial automation system of claim 15, wherein the fieldbus network is a CANopen network.

17. The industrial automation system of claim 15, wherein the PLC is adapted to save the configuration file.

18. The industrial automation system of claim 17, wherein saving the configuration file comprises saving a date and a time corresponding to when the configuration file was created.

19. The industrial automation system of claim 18, wherein the PLC is further adapted to determine, responsive to detecting that the I/O module re-boots, whether a current configuration file on the I/O module has a date and time that match the date and time corresponding to when the configuration file was created.

20. In a distributed control system of an industrial automation network, the control system having a master device, a slave device, and a sub-network of control devices that includes a first control device, a method, comprising:
  receiving at the slave device, from the master device, a data payload via a fieldbus protocol;
  configuring the slave device based on a first portion of the data payload; and
  configuring, by the slave device, the sub-network of control devices based on a second portion of the data payload.

21. The method of claim 20, wherein the second portion of the data payload comprises a plurality of sub-network configuration objects.

22. The method of claim 20, wherein the fieldbus protocol is a CANopen protocol.

23. A method in an industrial automation network, comprising:
  receiving, by a slave device from a master device, a configuration file in a data payload via a fieldbus protocol over the industrial automation network;
  configuring the slave device using the configuration file; and
  configuring, by the slave device, a first device coupled to the slave device using only a portion of the configuration file.

* * * * *